US 8,672,095 B2

(12) United States Patent
Charier et al.

(10) Patent No.: US 8,672,095 B2
(45) Date of Patent: Mar. 18, 2014

(54) METHOD AND SYSTEM FOR LUBRICATING A TURBINE ENGINE

(75) Inventors: Gilles Alain Charier, La Grande Paroisse (FR); Gerard Philippe Gauthier, Champagne sur Seine (FR); Laurent Gille, Dammarie les Lys (FR); Serge Rene Morreale, Guignes (FR)

(73) Assignee: SNECMA, Paris (FR)

( * ) Notice: Subject to any disclaimer, the term of this patent is extended or adjusted under 35 U.S.C. 154(b) by 400 days.

(21) Appl. No.: 13/120,163

(22) PCT Filed: Sep. 11, 2009

(86) PCT No.: PCT/FR2009/051713
§ 371 (c)(1),
(2), (4) Date: Mar. 22, 2011

(87) PCT Pub. No.: WO2010/031948
PCT Pub. Date: Mar. 25, 2010

(65) Prior Publication Data
US 2011/0198155 A1  Aug. 18, 2011

(30) Foreign Application Priority Data
Sep. 22, 2008  (FR) .................................. 08 56340

(51) Int. Cl.
F01D 25/18 (2006.01)
F01M 11/08 (2006.01)
F01D 25/20 (2006.01)
F02C 7/06 (2006.01)

(52) U.S. Cl.
USPC ....................................... 184/6.23

(58) Field of Classification Search
USPC ................................................ 184/6.11, 6.23
See application file for complete search history.

(56) References Cited

U.S. PATENT DOCUMENTS

| 3,527,054 A | 9/1970 | Hemsworth |
| 3,722,624 A | 3/1973 | Buckland |
| 4,525,995 A | 7/1985 | Clark |
| 4,531,358 A | 7/1985 | Smith |
| 4,962,829 A * | 10/1990 | Sugden ........................ 184/6.23 |

(Continued)

FOREIGN PATENT DOCUMENTS

| FR | 1 540 003 | 9/1968 |
| FR | 2 491 141 | 4/1982 |
| GB | 1 301 282 | 12/1972 |

OTHER PUBLICATIONS

International Search Report issued Feb. 5, 2010 in PCT/FR09/051713 filed Sep. 11, 2009.

Primary Examiner — William E Dondero
Assistant Examiner — Robert T Reese
(74) Attorney, Agent, or Firm — Oblon, Spivak, McClelland, Maier & Neustadt, L.L.P.

(57) ABSTRACT

A method and a system for lubricating a turbine engine including at least three separate housings each including at least one roller bearing. The method pressurizes the housings through seals, of which two main housings are pressurized at a pressure higher than that of a remaining secondary housing, lubricates a secondary roller bearing only by injecting an oil mist from at least one of the main housings, the oil mist being supplied by a pressure difference between the main housings and the secondary housing, recovers a remainder of the lubrication oil injected into the main housings to supply the same to an oil tank, and supplies the air/oil mixture from the secondary housing to an oil separator.

11 Claims, 2 Drawing Sheets

(56) References Cited

U.S. PATENT DOCUMENTS 7,040,811 B2 * 5/2006 Dusserre-Telmon et al. ... 384/99
7,163,086 B2 * 1/2007 Care et al. .................. 184/6.11

2001/0047651 A1    12/2001 Fukutani
2009/0101444 A1 *  4/2009 Alecu ..................... 184/11.2
2010/0028127 A1 *  2/2010 Cornet et al. ................. 415/1

* cited by examiner

METHOD AND SYSTEM FOR LUBRICATING A TURBINE ENGINE

BACKGROUND OF THE INVENTION

The present invention relates to the general field of dynamic lubrication of an aviation turbomachine.

An aviation turbomachine has numerous elements that need to be lubricated; these include in particular rolling bearings used for supporting its shafts in rotation, and also the gears of its accessory drive gearbox.

In particular, in order to reduce friction, wear, and heating due to the high speed of rotation of the shafts of the turbomachine, the rolling bearings that support them need to be lubricated. Since simple lubrication by injecting oil solely during periods of turbomachine maintenance do not suffice, recourse is generally had to so-called "dynamic" lubrication.

Dynamic lubrication consists in putting oil into continuous circulation in a lubrication circuit. A flow of lubricating oil coming from a tank is thus delivered by a pump against the rolling elements of the bearings, which bearings are housed in enclosures that are closed by sealing gaskets. In order to avoid any leak of lubricating oil from the enclosures to the remainder of the turbomachine through the sealing gaskets, a flow of air taken from one of the compressors of the turbomachine is injected through said gaskets. The enclosures are thus pressurized relative to atmospheric pressure.

The main fraction of the air introduced into the enclosures is then discharged to the outside of the turbomachine by following a special circuit for removing oil therefrom and for controlling the pressure inside the enclosures. The lubricating oil injected into the enclosures is recovered from the bottoms of the enclosures by recovery pumps via another special circuit. In order to ensure that the enclosure is fully dried, a small fraction of the air is also sucked into these pumps and the air/oil mixture as recovered in this way needs to be separated prior to returning the de-aerated oil to the tank.

Such a lubrication method presents various drawbacks. In particular, the lubricating oil needs to be conveyed via multiple arrangements: pipes, nozzles, centrifugal scoops, centripetal scoops, crescents, channels, etc. Discharging the oil and the air carrying oil droplets also requires the use of recovery pumps and a de-oiler, thereby increasing the weight of the turbomachine.

These drawbacks are acceptable once the thermal power generated by the rolling bearings of the turbomachine is high enough to justify having recourse to such a lubrication system. This applies in particular to turbomachines in which the speed of rotation of the bearings is considerable at high power (e.g. of the order of 6000 revolutions per minute (rpm) to 8000 rpm for the low pressure shaft and of the order of 14,000 rpm to 20,000 rpm for the high pressure shaft of a two-spool turbomachine).

In contrast, when the rolling elements of one of the bearings of the turbomachine rotate at a speed that is relatively low (e.g. of the order of 1000 rpm), the power generated by the rolling elements of the bearing is too small to justify having recourse to such a lubrication system. In such a situation, it can happen that an excessive flow of lubricating oil is injected into the enclosure containing the rolling bearing that operates at a low speed of rotation, and there is a risk of oil leaking from the enclosure.

OBJECT AND SUMMARY OF THE INVENTION

A main object of the present invention is thus to mitigate such drawbacks by proposing a method and a system for lubricating a turbomachine having at least three distinct enclosures, each containing at least one rolling bearing, and enabling the rolling bearings to be lubricated effectively without having recourse to complicated arrangements.

In accordance with the invention, this object is achieved by a method consisting in:

pressurizing the enclosures by injecting therein a flow of compressed air through sealing gaskets closing said enclosures, two of said enclosures, referred to as "main" enclosures, being pressurized at a pressure higher than the remaining enclosure, referred to as a "secondary" enclosure;

lubricating the rolling bearings of the main enclosures by injecting therein a flow of oil taken from an oil tank of the turbomachine;

lubricating the rolling bearing of the secondary enclosure solely by injecting an oil mist coming from at least one of the main enclosures, said oil mist being conveyed by the pressure difference between the main and secondary enclosures;

recovering the remainder of the lubricating oil injected into the main enclosures to convey it to the oil tank; and conveying the air/oil mixture coming from the secondary enclosure to a de-oiler in order to separate the air and the oil.

The term "oil mist" is used to mean a stream of air carrying droplets of oil in suspension. When the rolling bearing of the secondary enclosure has a speed of rotation that is low relative to that of the bearings in the main enclosures (e.g. of the order of 1000 rpm), the use of an oil mist coming from at least one of the main enclosures suffices amply for ensuring good lubrication of the bearings. This results in the lubrication system being simplified and lightened (by omitting an oil nozzle, a recovery pump, a degassing channel, and de-oilers).

Various different implementations of such a method are possible.

In a first implementation, the rolling bearing of the secondary enclosure is lubricated by injecting a mist of oil taken from both main enclosures.

In a second implementation, the rolling bearing of the secondary enclosure is lubricated by injecting an oil mist taken solely from one of the two main enclosures.

The invention also provides a turbomachine lubrication system comprising:

at least three distinct enclosures, each containing at least one rolling bearing and each closed by sealing gaskets;

means for introducing a flow of compressed air into the enclosures via the sealing gaskets in order to pressurize the enclosures, two of the enclosures, referred to as "main" enclosures, being pressurized at a pressure higher than the remaining enclosure, referred to as a "secondary" enclosure;

means for injecting a flow of oil against the rolling bearings of the main enclosures, the flow of oil being taken from an oil tank of the turbomachine;

an injection duct connecting at least one of the main enclosures to the secondary enclosure in order to inject an oil mist against the rolling bearing of the secondary enclosure, the oil mist being taken from at least one of the main enclosures;

means for recovering from bottom outlets of the main enclosures the remainder of the lubricating oil injected therein in order to convey it to the oil tank; and means for conveying the air/oil mixture taken from a bottom outlet of the secondary enclosure to a de-oiler.

The invention also provides a turbomachine including a lubrication system as described above.

BRIEF DESCRIPTION OF THE DRAWINGS

Other characteristics and advantages of the present invention appear from the following description given with reference to the accompanying drawings that show embodiments having no limiting character. In the figures.

DETAILED DESCRIPTION OF EMBODIMENTS

The invention applies to any aviation turbomachine having at least three enclosures containing rolling bearings. It applies more particularly to a turbomachine having a two-stage contrarotating fan.

Figure 1:
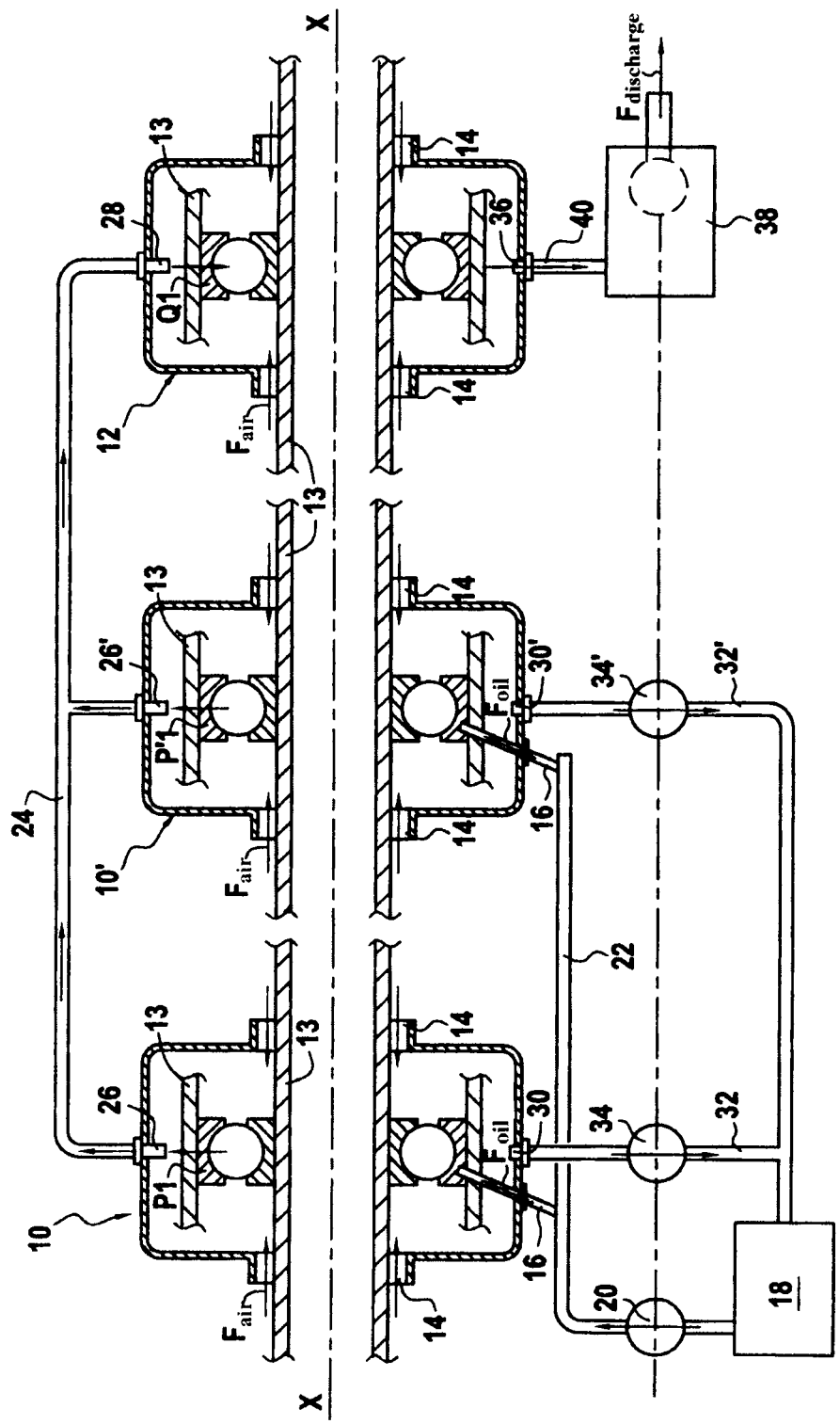
FIG. 1 is a diagrammatic view of a lubrication system in a first embodiment of the invention.

FIG. 1 is a highly diagrammatic view of a lubrication system applied to a turbomachine having a two-stage contrarotating fan.

The turbomachine has a longitudinal axis X-X with three distinct annular enclosures, namely: two so-called "main" enclosures 10 and 10' formed at the upstream end of the turbomachine and each containing at least one rolling bearing, respectively P1 and P'1, and a so-called "secondary" enclosure 12 formed downstream and containing at least one rolling bearing Q1. For convenience, only one bearing is shown per enclosure in FIG. 1. Naturally, each enclosure could have more than one bearing.

Figure 2:
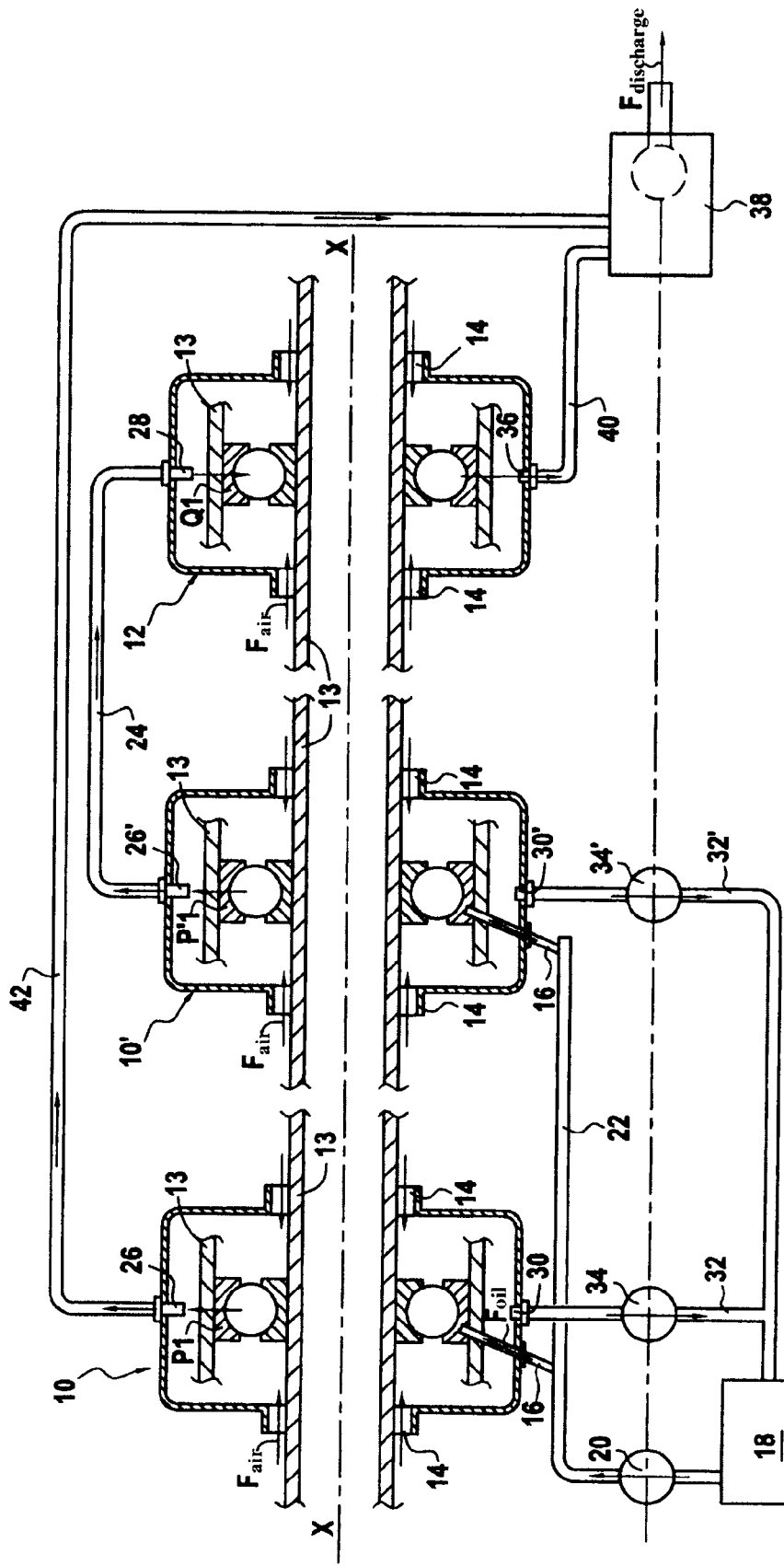
FIG. 2 is a diagrammatic view of a lubrication system in a second embodiment of the invention.

In well-known manner, these various rolling bearings (which may be ball bearings or roller bearings) support various spools of the turbomachine in rotation in order to take up radial and axial loads of the turbomachine. In FIGS. 1 and 2, reference 13 designates shaft portions of turbomachine spools or casing portions on which the rings of the rolling bearings are mounted.

Furthermore, given the speeds of rotation of the shafts of the turbomachine, the rolling elements of the bearing Q1 of the secondary enclosure 12 rotate at a speed that is relatively low (e.g. of the order of 1000 rpm to 2000 rpm) compared with the rolling elements of the bearings P1 and P'1 in the main enclosures 10 and 10' (e.g. rotating at a speed of the order of 6000 rpm to 20,000 rpm).

The main and secondary enclosures 10, 10' and 12 are distinct from one another, and each of them is hermetically closed at its upstream and downstream ends by annular sealing gaskets 14. By way of example, these sealing gaskets are labyrinth seals, brush gaskets, or carbon ring seals.

To reduce friction, wear, and heating, due in particular to the high speed of rotation of the shafts of the turbomachine, the rolling bearings in the main and secondary enclosures need to be lubricated. This lubrication is performed by a method and a system that are described below.

The rolling bearings P1 and P'1 of the main enclosures 10 and 10' are lubricated by injecting oil continuously between their rings. This injection is performed via injection nozzles 16 opening out in register with the rings. In FIG. 1, this injection of lubricating oil is represented by arrows $F_{oil}$.

The oil used for lubricating these rolling bearings P1 and P'1 comes from an oil tank 18 of the turbomachine. The oil is taken from the tank 18 by means of an oil feed pump 20 and is fed to an oil circuit 22 that is connected to each injection nozzle 16.

A flow of compressed air is also introduced into the main and secondary enclosures 10, 10', and 12 via their respective sealing gaskets 14. By way of example, this flow of air comes from air taken from the high pressure compressor of the turbomachine and is represented by arrows $F_{air}$ in FIG. 1. It serves to pressurize these enclosures so as to avoid lubricating oil escaping therefrom.

Furthermore, in accordance with the invention, the main enclosures 10 and 10' are more highly pressurized than is the secondary enclosure 12, i.e. the pressure that exists inside each of the main enclosures is higher than the pressure that exists in the secondary enclosure. This is made possible by introducing a greater flow of compressed air into the main enclosures than into the secondary enclosure.

The rolling bearing Q1 of the secondary enclosure 12 is lubricated by injecting a mist of oil coming from each of the main enclosures 10 and 10'. This oil mist is conveyed by means of at least one injection duct 24 connecting the top portions of first outlets 26 and 26' (referred to as top outlets) of the main enclosures to an inlet 28 of the secondary enclosure, which inlet opens out in register with the bearing Q1 therein. Given the pressure difference that exists between the main enclosures and the secondary enclosure, no pump is needed to cause the oil mist to flow from the main enclosures to the secondary enclosure.

The oil mist is a stream of air carrying droplets of oil in suspension, these oil droplets coming from the lubrication of the rolling bearings P1 and P'1 of the main enclosures. Since the rolling bearing Q1 of the secondary enclosure rotates at a speed that is slower than that of the other bearings, it can be lubricated merely by injecting the oil mist. Thus, no oil injection via an injection nozzle (or any other equivalent device) is provided for lubricating the bearing Q1.

In its bottom portion, each main enclosure 10 and 10' also includes a specific second outlet 30 or 30' (referred to as a bottom outlet) serving to recover the remainder of the lubricating oil injected into these enclosures. For this purpose, each of these bottom outlets 30, 30' leads into a discharge duct 32, 32' connected to the oil tank 18 of the turbomachine (via air/oil separators that are not shown in FIG. 1). Discharge pumps 34 and 34' serve to convey the remainder of the lubricating oil to the oil tank 18.

The secondary enclosure 12 also has a specific bottom outlet 36 in its bottom portion serving to recover the air/oil mixture coming from lubricating the bearing Q1 and deliver it to a de-oiler 38. For this purpose, the bottom outlet 36 is connected to the de-oiler 38 by means of a discharge duct 40. The de-oiler separates the air and the oil, with the oil being returned to the oil tank 18 of the turbomachine (return not shown in FIG. 1) and with the oil being discharged to the outside thereof (discharge represented by arrow $F_{discharge}$ in FIG. 1).

With reference to FIG. 2, there follows a description of a second lubrication method and system of the invention. Here the turbomachine also has two main enclosures 10 and 10' and a secondary enclosure 12.

In contrast, this second embodiment differs from the first embodiment in that the injection duct 24 connects only one of the main enclosures (specifically the main enclosure 10') to the secondary enclosure 12. Thus, the rolling bearing Q1 of the secondary enclosure 12 is lubricated solely by injecting an oil mist coming from only one of the two main enclosures.

Naturally, the injection duct could equally well connect the other main enclosure (i.e. the enclosure 10) to the secondary enclosure 12. As in the other embodiment, no oil injection is performed by means of an injection nozzle (or any other equivalent device) for lubricating the rolling bearing Q1 of the secondary enclosure.

The first outlet 26 in the top portion of the main enclosure 10 that is not connected to the secondary enclosure 12 is connected to the de-oiler 38 by means of a duct 42 in order to separate the air and the oil of the air/oil mist coming from said main enclosure.

Finally, it should be observed that the oil feed pump 20, the discharge pumps 34, and the de-oiler 38 in both embodiments may be coupled to the accessory drive gearbox of the turbomachine (not shown) in order to be driven thereby. Alternatively, some or all of these accessories could be electrically driven.

The invention claimed is:

1. A method of lubricating a turbomachine including distinct first, second, and third enclosures each including at least one rolling bearing, the method comprising:
pressurizing the enclosures by injecting therein a flow of compressed air through sealing gaskets closing the enclosures, the first and second enclosures being main enclosures being pressurized at a pressure higher than the third enclosure being a secondary enclosure;
lubricating the rolling bearing of each of the main enclosures by injecting therein a flow of oil taken from an oil tank of the turbomachine via an injection nozzle provided at each of the main enclosures;
lubricating the rolling bearing of the secondary enclosure solely by injecting an oil mist directly coming from a first outlet of at least one of the main enclosures via an injection duct to an inlet of the secondary enclosure, the injection duct connecting the first outlet of the at least one of the main enclosures to the inlet of the secondary enclosure, the oil mist being conveyed by a pressure difference between the main and secondary enclosures;
recovering a remainder of the lubricating oil injected into the main enclosures via a second outlet to convey the remainder of the lubricating oil to the oil tank via a discharge duct; and
conveying the air/oil mixture coming from the secondary enclosure to a de-oiler via an outlet to separate the air and the oil.

2. A method according to claim 1, wherein the rolling bearing of the secondary enclosure is lubricated by directly injecting a mist of oil taken from both main enclosures.

3. A method according to claim 1, wherein the rolling bearing of the secondary enclosure is lubricated by directly injecting an oil mist taken solely from one of the two main enclosures.

4. A method according to claim 1, wherein the first outlet of the at least one of the main enclosures is provided at a top of the at least one of the main enclosures and the second outlet of the main enclosures is provided at a bottom of the main enclosures.

5. A method according to claim 1, wherein the inlet of the secondary enclosure is provided at a top of the secondary enclosure and the outlet of the secondary enclosure is provided at a bottom of the secondary enclosure.

6. A system for lubricating a turbomachine, the system comprising:
distinct first, second, and third enclosures, each including at least one rolling bearing and each closed by sealing gaskets;
means for introducing a flow of compressed air into the enclosures via the sealing gaskets to pressurize the enclosures, the first and second enclosures being main enclosures being pressurized at a pressure higher than the third enclosure being a secondary enclosure;
an injection nozzle provided at each of the main enclosures which injects a flow of oil against the rolling bearings of the main enclosures, the flow of oil being taken from an oil tank of the turbomachine;
an injection duct connecting a first outlet of at least one of the main enclosures to an inlet of the secondary enclosure to directly inject an oil mist against the rolling bearing of the secondary enclosure, the oil mist being taken from the at least one of the main enclosures;
a discharge duct which connects second outlets of the main enclosures to the oil tank such that a remainder of the lubricating oil injected in the main enclosures is conveyed to the oil tank via the discharge duct; and
means for conveying the air/oil mixture taken from a bottom outlet of the secondary enclosure to a de-oiler.

7. A system according to claim 6, wherein the injection duct connects both main enclosures to the secondary enclosure to directly inject an oil mist against the rolling bearing of the secondary enclosure, the oil mist being taken from both main enclosures.

8. A system according to claim 6, wherein the injection duct connects only one of the two main enclosures to the secondary enclosure to directly inject an oil mist against the rolling bearing of the secondary enclosure, the oil mist being taken solely from the one main enclosure, the other main enclosure being connected to the de-oiler by a duct.

9. A system according to claim 6, wherein the first outlet of the at least one of the main enclosures is provided at a top of the at least one of the main enclosures and the second outlet of the main enclosures is provided at a bottom of the main enclosures.

10. A system according to claim 6, wherein the inlet of the secondary enclosure is provided at a top of the secondary enclosure and the outlet of the secondary enclosure is provided at a bottom of the secondary enclosure.

11. A turbomachine including a lubrication system according to claim 6.

* * * * *